(12) United States Patent
LaGrone et al.

(10) Patent No.: US 9,853,817 B2
(45) Date of Patent: Dec. 26, 2017

(54) GENERATING ENHANCED DIGITAL SIGNATURES FOR ARTIFACTS

(71) Applicant: Lockheed Martin Corporation, Bethesda, MD (US)

(72) Inventors: Mark L. LaGrone, Weatherford, TX (US); Michael R. Lloyd, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 136 days.

(21) Appl. No.: 14/948,901

(22) Filed: Nov. 23, 2015

(65) Prior Publication Data

US 2017/0149568 A1    May 25, 2017

(51) Int. Cl.
*H04L 9/32* (2006.01)
*G06F 12/14* (2006.01)
*H04L 29/06* (2006.01)

(52) U.S. Cl.
CPC ........ *H04L 9/3247* (2013.01); *G06F 12/1408* (2013.01); *H04L 63/0823* (2013.01); *H04L 63/0853* (2013.01); *G06F 2212/1052* (2013.01)

(58) Field of Classification Search
CPC .............. H04L 9/3247; H04L 63/0823; H04L 63/0853; G06F 12/1408; G06F 2212/1052
USPC ................. 713/156, 161, 168, 176
See application file for complete search history.

(56) References Cited

U.S. PATENT DOCUMENTS

| 6,199,053 | B1 | 3/2001 | Herbert et al. | |
|---|---|---|---|---|
| 6,629,244 | B2 | 9/2003 | Davis et al. | |
| 7,574,479 | B2 | 8/2009 | Morris et al. | |
| 8,135,331 | B2 | 3/2012 | Rao | |
| 8,468,330 | B1 | 6/2013 | Reed et al. | |
| 8,549,087 | B2 | 10/2013 | Leonard | |
| 8,826,391 | B2 | 9/2014 | Tkacik et al. | |
| 8,843,744 | B2 | 9/2014 | Sentinelli et al. | |
| 9,009,477 | B2 | 4/2015 | Das | |
| 2006/0271787 | A1 | 11/2006 | DeYoung et al. | |
| 2008/0040808 | A1* | 2/2008 | Tokie | G06F 21/645 726/26 |
| 2009/0028338 | A1* | 1/2009 | Martin | G06F 21/121 380/277 |
| 2012/0124379 | A1* | 5/2012 | Teranishi | H04L 9/3249 713/175 |

(Continued)

OTHER PUBLICATIONS

IHE ITI Technical Committee, "IHE IT Infrastructure Technical Framework Supplement Document—Digital Signature (DSG)," Trial Interpretation, IHE International, Inc., Copyright © 2015, Rev. 2.1—Mar. 12, 2015, 26 pages.

*Primary Examiner* — Aravind Moorthy (74) *Attorney, Agent, or Firm* — Baker Botts L.L.P.

(57) ABSTRACT

A system comprises a memory, interface, and processor. The system is operable to store a plurality of attestations, where at least one of the plurality of attestations comprise a reason statement for signing an artifact. The system is further operable to display at least one of the plurality of attestations and receive a first selection of a first attestation. The system generates an expanded artifact by concatenating the artifact and the first attestation. The system creates a first digital signature based on the expanded artifact creates a first enhanced digital signature by applying the first digital signature and the first attestation. Further, the system stores the first enhanced digital signature.

20 Claims, 4 Drawing Sheets

(56) References Cited

U.S. PATENT DOCUMENTS

| | | | |
|---|---|---|---|
| 2013/0096943 A1 | 4/2013 | Carey et al. | |
| 2013/0326225 A1* | 12/2013 | Murao | H04L 9/3247 |
| | | | 713/176 |
| 2014/0019766 A1 | 1/2014 | Takahashi et al. | |
| 2015/0100785 A1* | 4/2015 | Joye | H04L 9/008 |
| | | | 713/168 |
| 2016/0048696 A1* | 2/2016 | Follis | G06F 21/6209 |
| | | | 726/28 |

* cited by examiner

GENERATING ENHANCED DIGITAL SIGNATURES FOR ARTIFACTS

GOVERNMENT INTEREST

This invention was made with government support under contract number N00019-02-C-3002 awarded by the Department of the Navy. The government may have certain rights in the invention.

TECHNICAL FIELD

This disclosure relates in general to enterprise security and protection and more particularly to generating enhanced digital signatures for artifacts.

BACKGROUND

In large enterprise businesses it is imperative that confidential and/or proprietary data be properly protected and authorized to be used for particular purposes. Current techniques for authorizing or validating artifacts and documents using digital signatures are limited.

SUMMARY OF PARTICULAR EMBODIMENTS

According to one embodiment, a system comprises a memory, interface, and processor. The system is operable to store a plurality of attestations, where at least one of the plurality of attestations comprise a reason statement for signing an artifact. The system is further operable to display at least one of the plurality of attestations and receive a first selection of a first attestation. The system generates an expanded artifact by concatenating the artifact and the first attestation. The system creates a first digital signature based on the expanded artifact and creates a first enhanced digital signature by concatenating the first digital signature and the first attestation. Further, the system stores the first enhanced digital signature.

Technical advantages of certain embodiments may include preventing use of an artifact for a purpose other than for what it has been validated. This reduces the likelihood that an artifact, for example, is improperly sent outside of the enterprise or an incomplete artifact is incorporated into a larger artifact before it is ready. Additionally, a detached enhanced digital signature of an artifact may be saved separately from the artifact itself and be linked to the artifact, thus reducing the resources used. This saves computational resources because it does not require verification each time a user opens the artifact. Other technical advantages will be readily apparent to one skilled in the art from the following figures, descriptions, and claims. Moreover, while specific advantages have been enumerated above, various embodiments may include all, some, or none of the enumerated advantages.

DETAILED DESCRIPTION OF THE DISCLOSURE

Some enterprises use digital signatures on artifacts when the artifacts are reviewed and allowed to be used for a certain purpose. However, to another user, it may be unclear why the artifact contains the digital signature. For example, one user may review an artifact, such as a document, and determine that it contains certain confidential information such that it is at a medium security level. A second user may see the first user's signature, but may not know why the first user reviewed the artifact or why it was signed. Yet another user may see the digital signature and assume it was for a different purpose. For example, the second user may believe that the first user signed the document to indicate that there is no confidential data in the artifact, and thus may send the artifact to users that do not have a sufficient security clearance to read the document. In this example, the artifact may be read by someone without a sufficient security clearance and thus there may be an increased risk to an enterprise that confidential information may be disclosed to incorrect parties.

The teachings of the disclosure recognize that it is desirable to utilize enhanced digital signatures with artifacts to address these and other problems. For example, it may be desirable to provide a reason statement with a digital signature so that other users understand what each artifact was reviewed for and what the signature indicates. Some embodiments of the following disclosure describe systems and methods for storing a plurality of attestations, where at least one of the attestations comprises a reason statement for signing an artifact. The embodiments may display at least one of the plurality of attestations and receive a first selection of a first attestation. The embodiments may further generate an expanded artifact by concatenating the artifact and the first attestation, generate a first digital signature of a first authorized user based on the expanded artifact, create a first enhanced digital signature by concatenating the first digital signature and the expanded artifact, and store the first enhanced digital signature.

Figure 1:
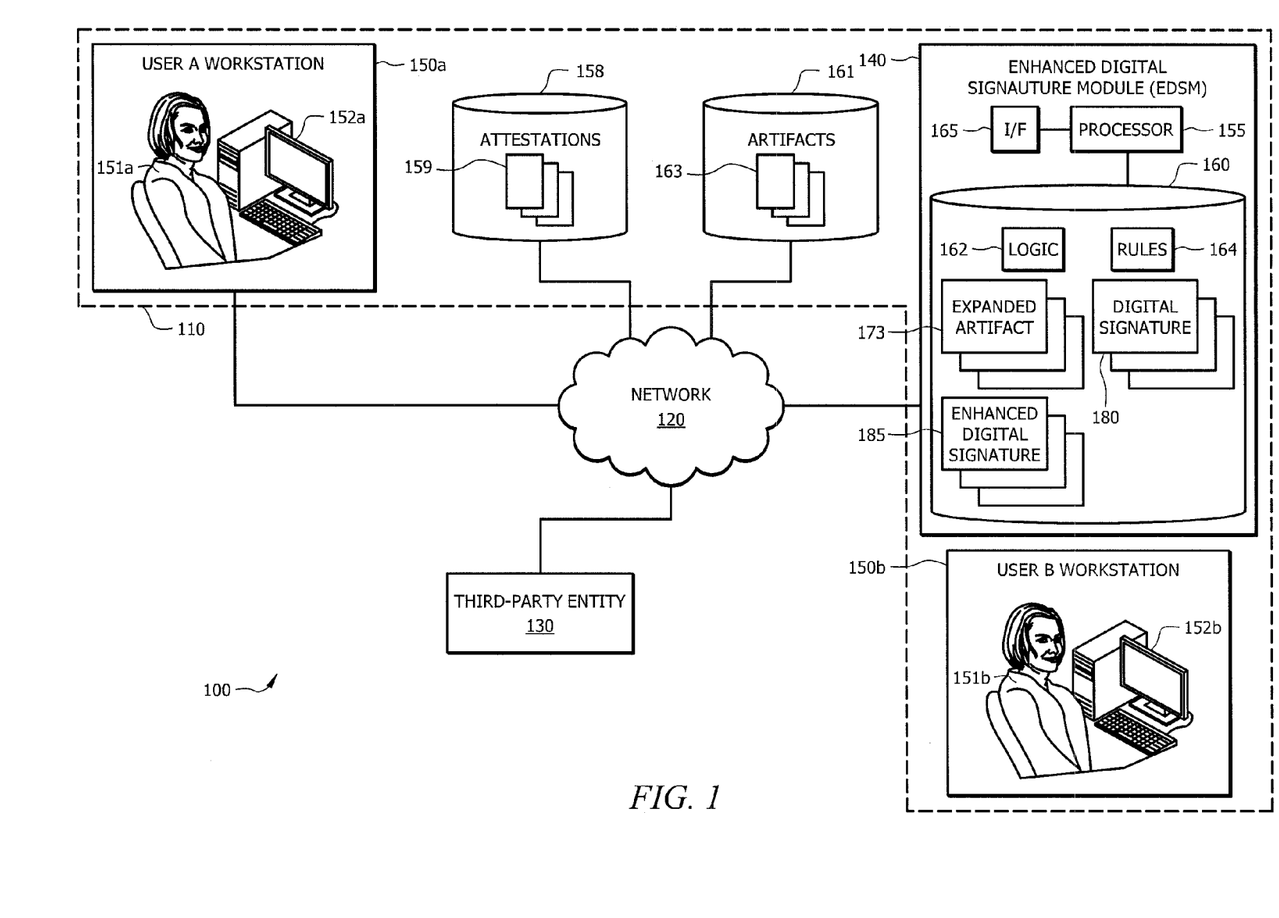
FIG. 1 illustrates a system that facilitates creating an enhanced digital signature for artifacts, according to certain embodiments.

FIG. 1 illustrates an example system 100 that facilitates generating an enhanced digital signature for artifacts. System 100 may include an enterprise 110, user workstations 150a-b, one or more data sources 158 and 161, or memory 160, one or more third-party entities 130, and one or more Enhanced Digital Signature Modules (EDSM) 140. Enterprise 110, user workstation 150, third-party entity 130, and EDSM 140 may be communicatively coupled directly or by network 120.

In general, EDSM 140 facilitates the generation of enhanced digital signatures for artifacts 163. EDSM 140 is operable to store a plurality of attestations 159, where at least one of plurality of attestations 159 comprises a reason statement for signing artifact 163. EDSM 140 is further operable to display at least one of the plurality of attestations 159 and receive a first selection of attestation 159. EDSM 140 generates expanded artifact 173 by concatenating artifact 163 and attestation 159. EDSM 140 generates digital signature 180 of an authorized user based on expanded artifact 173 and creates an enhanced digital signature 185 by concatenating attestation 159 and digital signature 180. Further, EDSM 140 stores enhanced digital signature 185 and can validate artifact 163 for a purpose based on one or more enhanced digital signatures 185.

In certain embodiments, enterprise 110 may refer to any organization, entity, business, company, agency, and the like. In some embodiments, enterprise 110 may include one or more computer systems 100. Computer system 100 is described in more detail below.

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. Network 120 may communicatively couple third-party entity 130 with enterprise 110.

In some embodiments, user workstation 150 may refer to any device that facilitates user 151 performing a function in or interacting with system 100. In some embodiments, user workstation 150 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100.

In some embodiments, user workstations 150a-b may also comprise graphical user interfaces (GUIs) 152a-b. GUIs 152a-b are generally operable to tailor and filter data entered by and presented to users 151a-b. GUIs 152a-b may comprise a plurality of displays having interactive fields, pull-down lists, and buttons operated by users 151a-b. GUIs 152a-b may include multiple levels of abstraction including groupings and boundaries. It should be understood that the term GUI 152 may be used in the singular or in the plural to describe one or more GUIs 152 and each of the displays of a particular GUI 152. It will be understood that system 100 may comprise any number and combination of user workstations 150a-b. Users 151a-b utilize user workstations 150a-b to interact with EDSM 140 to, for example, transmit selection data and transmit confirmation data, as described below.

Data sources 158 and 161 or memory 160 may refer to any module, database, or suitable storage device to store information for enterprise 110. Data sources 158 and 161 or memory 160 may include any number of files, folders, and portions of data. For example, data source 161 may store one or more artifacts 163. Artifact 163 may be a document, a file, a slideshow presentation, source code, a function, a picture, or any configurable unit of information that supports enterprise 110. Artifacts 163 may be checked in and out by users 151a-b in order to make edits or changes to artifact 163. Data source 158 may store attestations 159. Attestations 159 may be one or more reason statements for signing artifact 163 combined with a digital signature 180 by an authorized user 151a-b, indicating that the language used in the reason statement is adequate. For example, the reason statement in attestation 159 may be "I have reviewed this artifact and confirm that it contains no confidential data." A digital signature 180 may be applied to this reason statement by an authorized user, for example, a member of the security team or a member of the legal team of enterprise 110. Attestation 159 may be combined with artifact 163 in order to create expanded artifact 173, which is used to create the enhanced digital signature, as described below. Having a repository of attestations 159, which includes reason statements with pre-approved language, ensures uniformity throughout enterprise 110. Thus, whenever users 151a-b digitally sign artifact 163 for a particular reason (i.e., approving to send to a third party, indicating level of confidentiality), the language indicating that reason is identical. By having a finite set of attestations 159 that are used multiple times by users 151a-b, rather than requiring users 151a-b to draft and save reason statements each time they review one or more artifacts 163, the resources used are reduced, including the memory required to store attestations 159 and the time spent by users 151a-b (i.e., because they can select a pre-approved attestation 159 instead of having to draft one from scratch each time). Artifacts 163 and attestations 159 may be stored in data sources 158 and 161 or memory 160, respectively, may be stored in the same data source 158 and 161 or memory 160 (i.e., both in data sources 158 and 161 or both in memory 160), or may be stored in any suitable location within enterprise 110.

Third-party entity 130 may refer to any entity that is not associated with and/or is remote to enterprise 110. For example, third-party entity 130 may be another enterprise, business, country, or user that is outside of enterprise 110. In some embodiments, before artifacts 163 are sent outside of enterprise 110 (i.e., to third-party entity 130), certain security checks or reviews must be performed. EDSM 140 may validate artifact 163 using enhanced digital signatures 185 in order to ensure that proper protocol has been performed before transmitting the artifact 163 outside of enterprise 110.

EDSM 140 may refer to any suitable combination of hardware and/or software implemented in one or more modules to process data and provide the described functions and operations. In some embodiments, the functions and operations described herein may be performed by a pool of EDSMs 140. In some embodiments, EDSM 140 may include, for example, a mainframe, server, host computer, workstation, web server, file server, a personal computer such as a laptop, or any other suitable device operable to process data. In some embodiments, EDSM 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, EDSM 140 generates digital signatures 180 based on expanded artifacts 173, creates enhanced digital signature 185 by concatenating digital signature 180 and attestation 159, and uses enhanced digital signatures 185 to validate an artifact 163 to allow it to be used for a certain purpose. Although shown in FIG. 1 as internal to enterprise 110, it should be understood that EDSM 140 may be internal or external to enterprise 110. In some embodiments, EDSM 140 may include a processor 155, memory 160, and an interface 165.

Memory 160 may refer to any suitable device capable of storing and facilitating retrieval of data and/or instructions. Examples of memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates memory 160 as internal to EDSM 140, it should be understood that memory 160 may be internal or external to EDSM 140, depending on particular implementations. Also, memory 160 may be separate from or integral to other memory devices to achieve any suitable arrangement of memory devices for use in system 100.

Memory 160 is generally operable to store logic 162, rules 164, expanded artifacts 173, digital signatures 180, and enhanced digital signatures 185. Logic 162 generally refers to algorithms, code, tables, and/or other suitable instructions for performing the described functions and operations. Rules 164 generally refer to policies or directions for generating enhanced digital signatures 185 and validating artifacts 163 for a purpose based on those enhanced digital signatures 185. Rules 164 may be predetermined or predefined, but may also be updated or amended based on the needs of enterprise 110.

Memory 160 communicatively couples to processor 155. Processor 155 is generally operable to execute logic 162 stored in memory 160 to generate enhanced digital signatures 185 and determine whether to validate artifact 163 based on enhanced digital signatures 185 associated with that artifact 163, according to the disclosure. Processor 155 may comprise any suitable combination of hardware and software implemented in one or more modules to execute instructions and manipulate data to perform the described functions for EDSM 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for EDSM 140, send output from EDSM 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system that allows EDSM 140 to communicate to other devices. Communication interface 165 may include any suitable software operable to access data from various devices such as user workstations 150a-b. Communication interface 165 may also include any suitable software operable to transmit data to various devices such as user workstations 150a-b. Communication interface 165 may include one or more ports, conversion software, or both. In general, communication interface 165 may retrieve artifacts 163 from data source 161, retrieve one or more attestations 159 from data source 158, transmit information to user workstations 150a-b, and receive information from user workstations 150a-b, such as a selection of attestation 159, approval of a reason statement, or confirmation that artifact 163 is in compliance with selected attestation 159.

In operation, logic 162 and rules 164, upon execution by processor 155, facilitate receiving a selection of attestation 159, generating expanded artifact 173 by concatenating artifact 163 and attestation 159, creating digital signature 180 of an authorized user based on expanded artifact 173, creating enhanced digital signature 185 by concatenating digital signature 180 and attestation 159, and storing enhanced digital signature 185. Logic 162 and rules 164 also facilitate validating artifact 163 for a purpose (i.e., transmitting artifact 163 to third-party entity 130) by determining a number and type of enhanced digital signatures 185 required to validate artifact 163, determining whether the number of enhanced digital signatures 185 associated with artifact 163 is greater than the number of enhanced digital signatures 185 required to validate the artifact 163 for the purpose, and, in response to determining that the number of enhanced digital signatures 185 associated with artifact 163 is greater than the number of enhanced digital signatures 185 required to validate the artifact 163 for the purpose, validating artifact 163 for the purpose.

In some embodiments, EDSM 140 creates attestation 159. Attestation 159 may be a document, file, or any other piece of data utilized by users 151a-b to attach a statement that explains the reason that artifact 163 received digital signature 180. In general, attestation 159 is created by EDSM 140 receiving a reason statement, receiving approval of the reason statement (i.e., it is stated correctly, accurately, legally) by an approved user, and applying digital signature 180 of the approved user to the reason statement. Attestations 159 may be stored in memory devices (e.g., database 158 or memory 160) so that users 151a-b may retrieve and select one or more to be used with another artifact 163. The process for creating attestations 159 is further described below in the description for FIG. 2.

In some embodiments, EDSM 140 displays at least one of the plurality of attestations 159 that may be stored in database 158. EDSM 140 may display attestations 159 on GUIs 152a-b. For example, attestations 159 may be displayed as a drop-down list allowing users 151a-b to make a selection among the attestations that are displayed. EDSM 140 may display the reason statements of those attestations 159 displayed. In some embodiments, users 151a-b may be reviewing artifact 163 for a particular purpose and want to sign artifact 163 for that purpose. Users 151a-b may read through available attestations 159 to determine which one should be used for this particular review. In some embodiments, EDSM 140 may receive a selection of one or more attestations 159. For example, if user 151a is reviewing artifact 163 for confidentiality, she may select attestation 159 that states "I have reviewed this document for confidentiality and assert that it contains highly confidential information." As another example, if user 151b is reviewing artifact 163 in order to send it to Italy, user 151b may select attestation 159 that states "I have reviewed this document and confirm that it complies with the export rules for Italy." EDSM 140 may store and display any number of attestations 159 for users 151a-b to select from.

In some embodiments, EDSM 140 generates expanded artifact 173 by concatenating artifact 163 and attestation 159. By concatenating artifact 163 and attestation 159 into expanded artifact 173, it prepares artifact 163 for the digital signature process, and for creating enhanced digital signature 185. In some embodiments, EDSM 140 extracts attestation 159 from enhanced digital signature 185 to recreate expanded artifact 173. This recreated expanded artifact 173 connects the reason that artifact 163 was signed with artifact 163 itself. EDSM 140 may use the recreated expanded artifact 173 to verify that artifact 163 has sufficient enhanced digital signatures 185 (e.g., a correct number and created by approved users) in order to take some action (e.g., transmitting to third-party entity 130) with artifact 163.

In some embodiments, EDSM 140 generates a digital signature 180 of user 151a or 151b based on expanded artifact 173. EDSM 140 may generate the digital signature 180 by computing a hash value for expanded artifact 173 and, for example, encrypting the hash value using software related to the user (e.g., card software related to the signer's card). In some embodiments, EDSM 140 may use public key infrastructure (PKI), keyless signature infrastructure (KSI), or any infrastructure sufficient to generate digital signature 180.

In some embodiments, EDSM 140 creates enhanced digital signature 185 by concatenating digital signature 180 and attestation 159. Once these two pieces are concatenated, enhanced digital signature 185 will essentially contain two items: (1) digital signature 180 (e.g., an encrypted hash of expanded artifact 173 associated with user 151a), and (2) attestation 159, indicating the reason that artifact 163 was signed (e.g., security clearance, compliance with export rules). This enhanced digital signature 185, unlike general digital signatures, includes attestation 159, which is a digitally signed reason statement for signing artifact 163. By including attestation 159 as part of enhanced digital signature 185, the reason that artifact 163 was reviewed and signed is apparent in the signature itself. Thus, time may be saved when users 151a-b need to perform an action with artifact 163. For example, if user 151a needs to transmit artifact 163 to third-party entity 130 it must first ensure that artifact 163 contains no confidential information. If enhanced digital signature 185 already indicates that user 151b has reviewed artifact 163 and confirmed that it contains no confidential information, then users 151a may transmit artifact 163 without needing to review herself.

In some embodiments, enhanced digital signature 185 may be an attached digital signature. In an attached enhanced digital signature, artifact 163 and the artifact's enhanced digital signature file are combined into a single file. ESDM 140 may combine the enhanced digital signature file with artifact 163 itself and save it as a single object. This approach generates a binary file that is stored in the system, thus nullifying any space-saving features associated with storing only changes to artifact 163. In other words, artifact 163 may need to be saved each time a change is made rather than merely saving the changes to artifact 163, which results in information being duplicated and saved repeatedly. Further, each time artifact 163 needs to be edited or changed, user 151a-b may need to receive verification and then extract artifact 163. Additionally, an attached enhanced digital signature may create difficulty when verifying or validating multiple attestations 159 or enhanced digital signatures 185 because artifact 163 may include multiple signature layers for each attached digital signature applied to it. In some embodiments, multiple attached enhanced digital signatures 185 may be packaged individually at the same level, so that there are not multiple signature layers.

In some embodiments, enhanced digital signature 185 may be a detached digital signature. In a detached enhanced digital signature 185, artifact 163 and enhanced digital signature 185 are maintained separately. This avoids the binary storage problem, because artifact 163 can be configured as it is normally stored, while enhanced digital signature 185 is stored as a separate object and linked to the artifact that it is associated with. Using a detached enhanced digital signature 185 also allows access to artifact 163 without the overhead of requiring verification and extraction of artifact 163 from the attached signature object. Thus, the detached signature approach allows any user 151a-b to bypass the digital signature verification process when verification is not needed for usage of the artifact, such as development.

In some embodiments, EDSM 140 may validate artifact 163 to be used for a particular purpose. For example, if artifact 163 must undergo a security review prior to its release (e.g., to third-party entity 130), enhanced digital signatures 185 can ensure that the review has been performed by authorized users. In this example, the validation requires artifact 163 to be reviewed by two users and a member of the security team prior to release. To document this review, three enhanced digital signatures 185 are created, which are associated with the specific version of artifact 163 reviewed. EDSM 140 may determine that artifact 163 has three enhanced digital signatures 185 with the correct attestation 159 corresponding to the release of artifact 163 (e.g., the attestation 159 includes a reason statement that there is no confidential information in artifact 163). In some embodiments, EDSM 140 receives a request to validate artifact 163, which triggers the validation process. This process of validating artifact 163 for a particular purpose is explained in FIG. 4 below.

In some embodiments, ESDM 140 may determine whether there are any invalid enhanced digital signatures 185 (e.g., by unauthorized users). EDSM 140 may scan databases (e.g., databases 158, 161 or others in enterprise 110) to determine whether there are any invalid enhanced digital signatures 185 (e.g., by unauthorized users) on a periodic basis (e.g., daily, weekly, monthly). EDSM 140 may determine that enhanced digital signatures 185 are invalid by comparing user 151a and the list of users 151a-b who are authorized to use particular attestations 159. For example, only members of the security team may be authorized to use attestations 159 regarding whether there is confidential data in artifact 163 or not. If for some reason an unauthorized user 151a is able to create enhanced digital signature 185 with attestation 159 regarding security, EDSM 140 may proactively scan and analyze enhanced digital signatures 185 to determine whether there are any invalid enhanced digital signatures 185.

In some embodiments, before allowing a second user 151a-b to provide a second enhanced digital signature 185 with the same attestation 159, EDSM 140 determines whether artifact 163 has been altered since the first attestation 159. In some embodiments, EDSM 140 may recalculate the expanded artifact 173 hash value for the target version of artifact 163, decrypt enhanced digital signature 185 (e.g., by decrypting the encrypted hash using the associated public key) to access the hash value for the version of artifact 163 when enhanced digital signature 185 was created, and compare the two hash values. If these two hash values are equal, then EDSM 140 may determine that artifact 163 has not been altered.

Modifications, additions, or omissions may be made to the systems described herein without departing from the scope of the invention. For example, system 100 may include any number of third-party entities 130, data sources 158, networks 120, user workstations 150a-b, and EDSMs 140. As another example, particular functions, such as creating attestations 159 may be performed by a separate component and EDSM 140 may retrieve attestations 159 when needed to create enhanced digital signatures 185. The components may be integrated or separated. Moreover, the operations may be performed by more, fewer, or other components. Additionally, the operations may be performed using any suitable logic 162 comprising software, hardware, and/or other logic. As used in this document, "each" refers to each member of a set or each member of a subset of a set.

Figure 2:
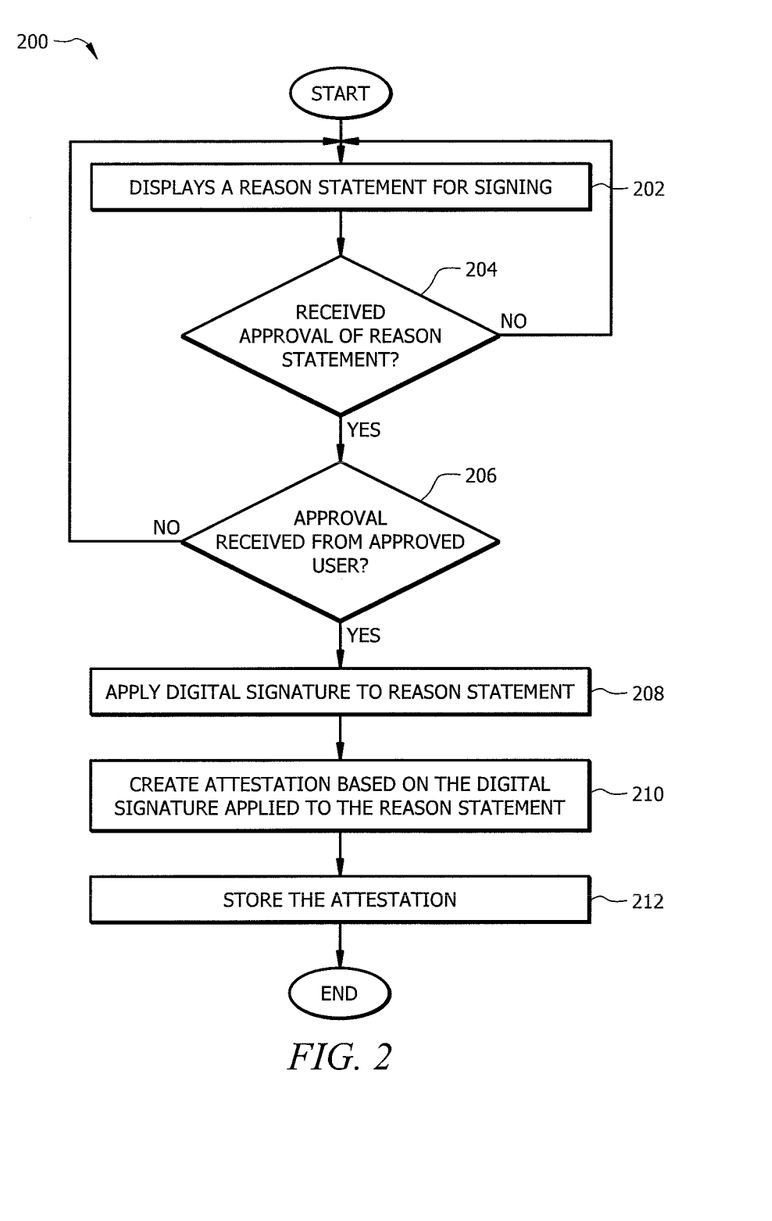
FIG. 2 is a flowchart illustrating a method of creating an attestation that may be used by the system of FIG. 1, according to certain embodiments.

FIG. 2 illustrates a method 200 of creating attestation 159 that may be used by the system of FIG. 1, according to certain embodiments. At step 202 of method 200, in some embodiments, EDSM 140 displays a reason statement for signing artifact 163. In some embodiments, EDSM 140 may display the reason statement on GUI 152a or 152b. The reason statement may include various reasons for signing artifact 163. Some reasons may include declaring that the artifact 163 has a certain security level, such as nothing classified, some classified, or all classified. Another example may include a reason for exporting artifact 163 to third-party entity 130. For example, certain rules or items may need to be confirmed before artifact 163 can be sent to another country. These reason statements may also include references to other documents, such as one document explaining checks that must be performed in order to sign this artifact 163 for this reason. For example, a reason statement providing "I have reviewed and confirmed that this artifact satisfies the requirements set forth in license 42 in order to export the artifact to Italy," includes a reference to license 42, which is another document. In another example, the reason statement may include actual requirements that user 151a-b must check in order to export artifact 163 to another country and/or a third-party entity 130. In some embodiments, EDSM 140 may display a reason statement that user 151a-b just input into the computer. For example, if user 151a-b is a member of the legal team and is creating a new attestation 159, user 151a-b may input the reason statement and EDSM 140 may display what user 151a-b just input.

At step 204, in some embodiments, EDSM 140 determines whether it has received approval of the reason statement. The approval can be received, for example, through a key stroke or a mouse click on GUI 152a or 152b. Users 151a or 151b may review the reason statement, edit the reason statement, and/or approve of the reason statement. If, at step 204, EDSM 140 has not received approval of the reason statement, then method 200 returns to step 202 and continues displaying the reason statement and waiting for approval. If, at step 204, EDSM 140 receives approval of the reason statement, then method 200 continues to step 206.

At step 206, in some embodiments, EDSM 140 determines whether it received approval (e.g., at step 204) from an approved user. EDSM 140 may store in memory 160 a list of approved users 151a-b who can approve of various reason statements. For example, if the reason statement is related to a legal requirement, then the list of approved users 151a-b may be members of a legal team of enterprise 110. As another example, if the reason statement relates to security, an approved user 151a-b may be a member of the IT group or an administrator at enterprise 110. In some embodiments, EDSM 140 may analyze the reason statement to determine what it relates to and select the appropriate list of approved users for use at step 206. EDSM 140 may compare user 151a-b who provided approval at step 204 to the list of approved users selected at step 206. If, at step 206, EDSM 140 determines that the approval was received by a non-approved user, then the method may return to step 202 and again display a reason statement. If, at step 206, EDSM 140 determines that approval was received from an approved user, then the method continues to step 208.

At step 208, in some embodiments, EDSM 140 applies digital signature 180 of approved user 151a or 151b to the reasons statement. EDSM 140 may apply digital signature 180 by computing the hash value for artifact 163 and encrypting the hash value using software related to the user (e.g., card software related to the signer's card). EDSM 140 may use public key infrastructure (PKI) or keyless signature infrastructure (KSI) to generate the digital signature 180. By applying the digital signature 180 to the reason statement, EDSM 140 creates attestation 159 at step 210. Thus, attestation 159 may include the reason statement as well as the digital signature 180 that was applied to the reason statement. In some embodiments, attestation 159 may include an attached digital signature, where the signature and the reason statement are stored as a single file. This attestation 159 ensures that standardized language for certain reason statements are used, but also the digital signature 180 applied to attestation 159 ensures that the reason statement has been reviewed and approved by an appropriate user 151a-b of enterprise 110. By creating attestations 159, enterprise 110 ensures that there is a uniform list of reason statements that are used for similar purposes. For example, this ensures that any time that artifact 163 is being signed to state that it includes no confidential data, the reason statement is uniform each time. For example, rather than having one user 151a say "there is no confidential data in this document" and a separate user 151b say "this document contains non-confidential data" both users 151a and 151b are required to use and select a prewritten and approved attestation 159 from database 158. This ensures that the language in the signed artifact 163 is consistent and reduces the likelihood of confusion based on differences in language among various attestations.

At step 212, in some embodiments, EDSM 140 stores attestation 159 created in step 210. Attestations 159 may be saved in data source 158, data source 161, or in memory 160 of EDSM 140. By storing attestations 159, users 151a or 151b may retrieve and review attestations 159 when they want to sign a document for a certain reason. By providing a database of attestations 159, enterprise 110 ensures uniform reason statements among all users 151a or 151b and ensures that the language of each attestation 159 has been approved by user 151-b with appropriate authority. After storing attestation 159, method 200 may end.

Modifications, additions, or omissions may be made to the methods described herein without departing from the scope of the invention. For example, the steps may be combined, modified, or deleted where appropriate, and additional steps may be added. In an embodiment where a reason statement may be approved by any user (e.g., rather than an approved user), EDSM 140 may omit step 206 of determining whether approval was received from an approved user. Additionally, the steps may be performed in any suitable order without departing from the scope of the present disclosure. For example, while EDSM 140 is discussed as performing the steps, any suitable component of system 100 may perform one or more steps of the method.

Figure 3:
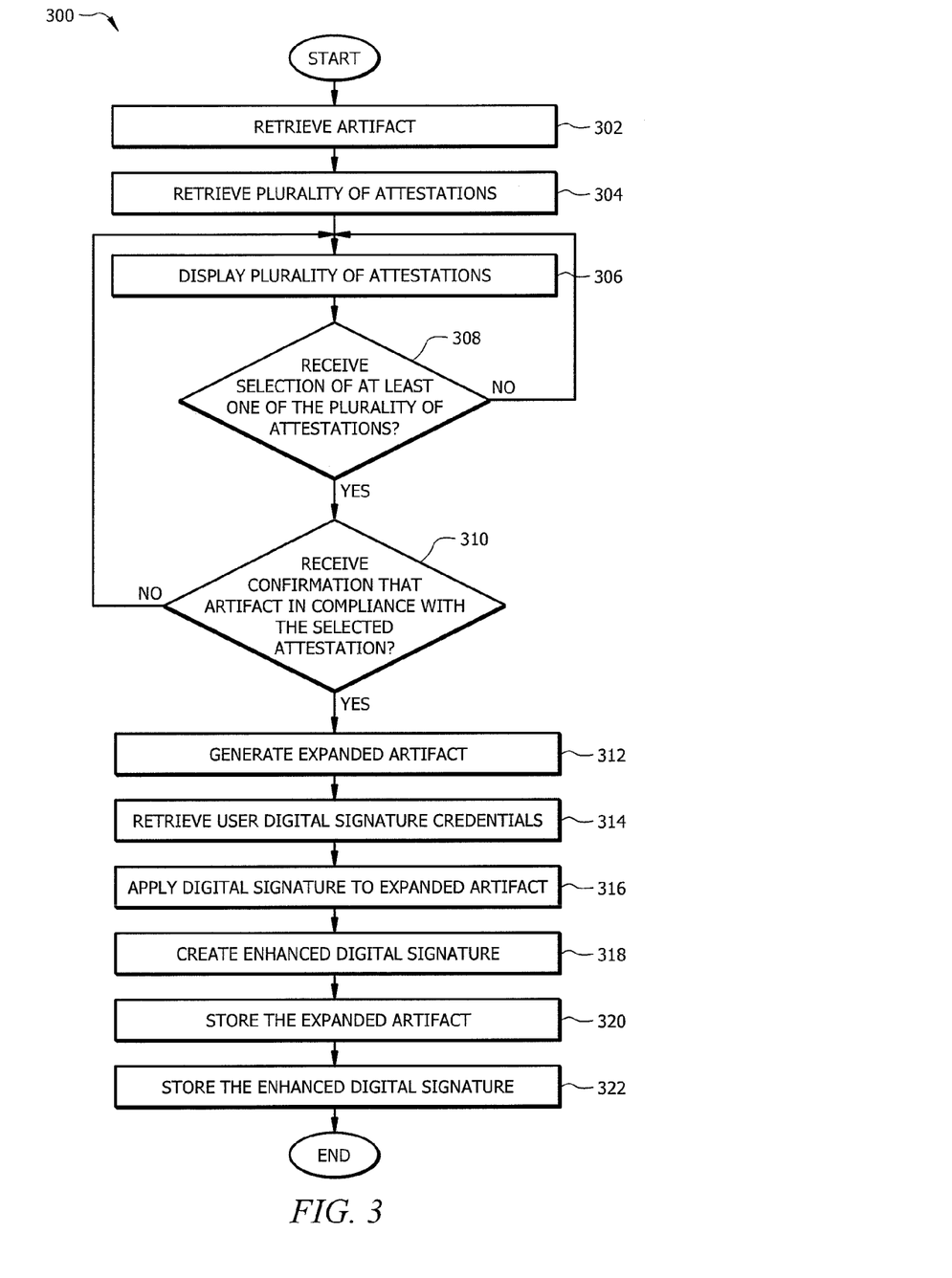
FIG. 3 is a flowchart illustrating a method of creating an enhanced digital signature that may be used by the system of FIG. 1, according to certain embodiments.

FIG. 3 illustrates a method 300 creating an enhanced digital signature that may be used by the system of FIG. 1, according to certain embodiments. Method 300 may begin at step 302, where, in some embodiments, EDSM 140 retrieves artifact 163. EDSM 140 may retrieve artifact 163 from database 161, memory 160, or any other storage device. Artifact 163 may be a document, a portion of code, or any other instance of data. In some embodiments, EDSM 140 may display retrieved artifact 163 on GUI 152a or 152b, such that user 151a or 151b can view, read, edit or analyze artifact 163.

At step 304, in some embodiments, EDSM 140 retrieves a plurality of attestations 159. Attestations 159 may be retrieved from database 158, memory 160, or any other suitable storage device. Attestations 159 may be created and stored as explained with reference to FIG. 2 above. EDSM 140 may retrieve one or more attestations 159 in order to facilitate creating enhanced digital signature 185. At step 306, in some embodiments, EDSM 140 displays the plurality of attestations 159 retrieved at step 304. EDSM 140 may display attestations 159 at GUI 152a or 152b. For example, the plurality of attestations 159 may be displayed as a number of folders, a drop down list, or any other visual that shows for what the attestations may be used. For example, in displaying attestation 159, GUIs 152a and 152b may show the reason statement and/or the signature of the approved user 151a-b as explained at steps 202 and 206 in FIG. 2 above. By displaying a plurality of attestations 159, user 151a or 151b may be able to select one of the plurality of attestations 159 to facilitate creating enhanced digital signature 185.

At step 308, in some embodiments, EDSM 140 determines whether a selection of at least one of the plurality of attestations 159 has been received. EDSM 140 may receive a selection, such as by user 151b clicking on GUI 152b with a mouse to select one of the plurality of attestations 159 in the drop down list. This selection may be communicated to EDSM 140 from GUI 152b to interface 165 via network 120. If, at step 308, EDSM 140 determines that it has not received a selection of at least one of the plurality of attestations 159, then method 300 returns to step 306 and continues to display a plurality of attestations 159 until one is selected. If, at step 308, EDSM 140 determines that a selection of one of the attestations 159 has been received, then method 300 continues to step 310.

At step 310, in some embodiments, EDSM 140 receives confirmation that artifact 163 is in compliance with attestation 159 selected at step 308. EDSM 140 may receive the confirmation from GUI 152a or 152b at interface 165 via network 120. In some embodiments, GUI 152a or 152b may display the requirements to comply with the selected attestation 159. For example, if user 151b wants to send an artifact 163 to third-party entity 130, attestation 159 may include items to check to ensure that artifact 163 can be transmitted to third-party entity 130 without harm to enterprise 110. For example, selected attestation 159 may require two different data points: (1) that there is no confidential information regarding enterprise 110 in artifact 163 and (2) that artifact 163 is encrypted. In order to receive confirmation that artifact 163 is in compliance with attestation 159 (e.g., which may state "I have determined that (1) there is no confidential data in the artifact and (2) that the artifact is encrypted") user 151b may, for example, click a box in GUI 152b to check off these two requirements. Clicking these two boxes may indicate to EDSM 140 that user 151b has confirmed artifact 163 is in compliance with attestation 159. If EDSM 140 does not receive confirmation, then method 300 returns to step 306 where it continues to display attestations 159. EDSM 140 can either display an entire list of attestations 159 for user 151b to choose from, or EDSM 140 may display selected attestation 159 from step 308, but further include a message that says that confirmation that artifact 163 is in compliance with selected attestation 159 is required and/or has not been received. If, at step 310, EDSM 140 receives confirmation that artifact 163 is in compliance with attestation 159, then method 300 continues to step 312.

At step 312, EDSM 140 generates expanded artifact 173. Expanded artifact 173 may be generated by concatenating artifact 163 (e.g., which was retrieved at step 302) and attestation 159 that was retrieved, displayed, selected and confirmed at steps 304-310. Expanded artifact 173 may be a single file that shows both artifact 163 as well as attestation 159. Thus if user 151b reviews expanded artifact 173, user 151b may be able to view the contents of artifact 163 itself as well as attestation 159 with a reason statement for signing. In some embodiments, artifact 163 may be combined with attestation 159 to create a new expanded artifact 173. This may be used when EDSM 140 creates an attached enhanced digital signature 185 (e.g., artifact 163, attestation 159, and digital signature 180 are all combined into one file). In some embodiments, artifact 163 may be saved independently and EDSM 140 may separately create expanded artifact 173 with a duplicated version of artifact 163 and attestation 159. This allows artifact 163 (stored independently) to continue to be viewed, edited, and reviewed by users 151a-b, but still save the current version of artifact 163 with the appended attestation 159.

At step 314, in some embodiments, EDSM 140 retrieves user digital signature credentials of user 151a or 151b. EDSM 140 may determine which user credentials to retrieve based on workstation 150a or 150b. For example, workstation 150a may be permanently assigned to or associated with user 151a. Thus, if the selection of attestation 159 in step 308 and the confirmation in step 310 were received from workstation 150a, then EDSM 140 may retrieve the credentials of user 151a. In some embodiments, EDSM 140 may require a selection of a user to retrieve that user's credentials. In some embodiments, EDSM 140 may require a username and/or password before retrieving that user's credentials to ensure the digital signature 180 is created only with the permission of user 151a or 151b.

At step 316, in some embodiments, EDSM 140 applies digital signature 180 to expanded artifact 173 in order to create enhanced digital signature 185 at step 318. Enhanced digital signature 185 in some embodiments can be a combination of the hash value of the expanded artifact 173 (e.g., which includes artifact 163 and attestation 159), digital signature 180 based on the hash value of expanded artifact 173, and attestation 159. Enhanced digital signature 185 shows that artifact 163 has been signed digitally by user 151a for the reason explained in attestation 159. For example, enhanced digital signature 185 indicates that user 151b reviewed artifact 163 and attests to the fact that artifact 163 does not contain any confidential information. By having this enhanced digital signature 185, enterprise 110 is able to determine for what artifact 163 has been reviewed and the purpose for which it was signed. For example, without using enhanced digital signature 185, user 151b may sign artifact 163 with the intent that it contains no confidential data. Continuing the example, user 151a may see that artifact 163 is signed but not know for what purpose. User 151a may assume that it was signed because it was reviewed for compliance with the export rules to send to a foreign country. Thus, user 151a may send artifact 163 to the foreign country based on user 151b's signature, but in fact artifact 163 had not been reviewed to ensure that the export rules were followed. Using enhanced digital signature 185 ensures that any time that artifact 163 is signed, a reason for the signing is indicated and/or can be determined, thus preventing misuses with artifact 163. In some embodiments, step 316 of the method illustrated in FIG. 3 can be performed using one or more techniques discussed above with respect to step 208 of FIG. 2

In some embodiments, enhanced digital signature 185 may be a single file that combines expanded artifact 173, attestation 159, and digital signature 180 of user 151b. In some embodiments, enhanced digital signature 185 may be a separate file that is linked to artifact 163, such that it can be determined which enhanced digital signatures 185 are associated with the current version of artifact 163. In some embodiments, expanded artifact 173 (combining artifact 163 and attestation 159) may be stored separately from enhanced digital signature 185. For example, user 151a may view a slide show presentation (e.g., artifact 163) that has a statement (e.g., attestation 159) saying that this has been reviewed and is in compliance with export rules to export to Italy. User 151a can further locate enhanced digital signature 185 associated with expanded artifact 173 and determine that this was signed and reviewed by user 151b.

At steps 320 and 322, in some embodiments, EDSM 140 may store expanded artifact 173 and enhanced digital signature 185, respectively. Depending on how artifact 163, attestation 159, and enhanced digital signature 185 are combined and/or linked, these steps may be combined or omitted. For example, if artifact 163, attestation 159, and enhanced digital signature 185 are saved as a single file, then they may not need to be saved separately. In some embodiments, artifact 163 may be a separate file to enhanced digital signature 185 with an association or a link between the two files. In that case, the two may need to be stored separately. After storing 173 with enhanced digital signature 185, method 300 ends.

Modifications, additions, or omissions may be made to the methods described herein without departing from the scope of the invention. For example, the steps may be combined, modified, or deleted where appropriate, and additional steps may be added. In some embodiments, EDSM 140 may not require that artifact 163 be displayed to user 151*a-b*, such that step 302 may be omitted. Additionally, the steps may be performed in any suitable order without departing from the scope of the present disclosure. While discussed as EDSM 140 performing the steps, any suitable component of system 100 may perform one or more steps of the method.

Figure 4:
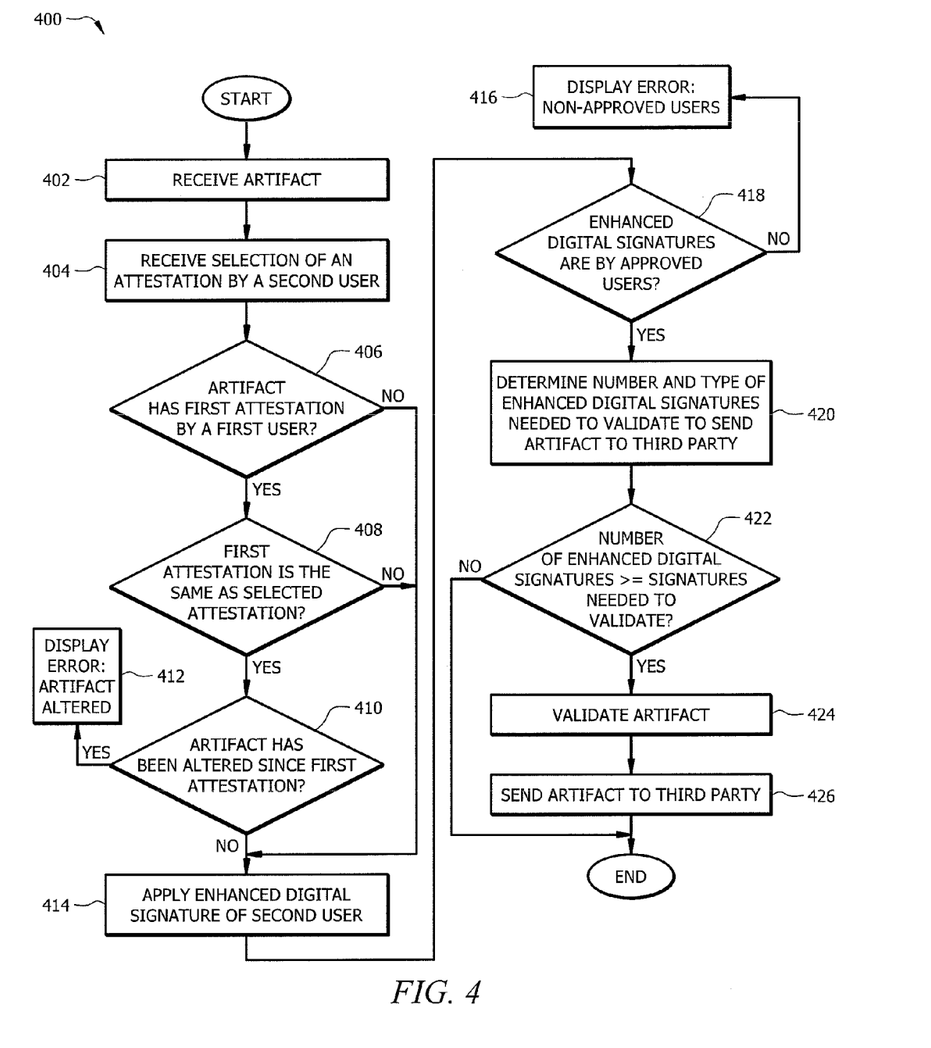
FIG. 4 is a flowchart illustrating a method of validating an artifact that may be used by the system of FIG. 1, according to certain embodiments.

FIG. 4 illustrates a method 400 that may be used by the system of FIG. 1, according to certain embodiments. At step 402, in some embodiments, EDSM 140 retrieves artifact 163. EDSM 140 may retrieve artifact 163 using interface 165 via network 120. At step 404, in some embodiments, EDSM 140 receives a selection of attestation 159 by user 151*a* or 151*b*. For example, EDSM 140 may receive a selection from GUI 152*b* and determine that this attestation 159 was selected by user 151*b*. In some embodiments, steps 402 and 404 of method 400 illustrated in FIG. 4 can be performed using one or more of the techniques discussed above with respect to steps 302 and 308 of FIG. 3.

At step 406, in some embodiments, EDSM 140 determines whether artifact 163 retrieved at step 402 has a first attestation 159 by a separate user than the user selecting attestation 159 in step 406. EDSM 140 may analyze artifact 163 and determine whether there are any attestations 159 or enhanced digital signatures 185 already associated with artifact 163. EDSM 140 may analyze and review certain databases of enterprise 110 to determine whether there are any attestations 159 appended to artifact 163 or associated with artifact 163. For example, if EDSM 140 generated expanded artifact 173 (e.g., as explained above in step 312 of FIG. 3), then EDSM 140 may analyze expanded artifact 173 and see what attestation 159 is attached to artifact 163 or what enhanced digital signature 185 with the same attestation 159 is linked to or associated with artifact 163. In some embodiments, EDSM 140 may determine that artifact 163 has no attached attestations 159 or linked enhanced digital signatures 185. If at step 406, EDSM 140 determines that artifact 163 does not have any other attestations 159 or enhanced digital signatures 185 associated with it, then method 400 continues to step 414, which is further explained below. If, at step 406, EDSM 140 determines that artifact 163 includes another attestation 159 or another enhanced digital signature 185 by a separate user, then method 400 continues to step 408.

At step 408, in certain embodiments, EDSM 140 determines whether the first attestation 159 from step 406 is the same as the selected attestation 159 from step 404. EDSM 140 may compare the two attestations 159, for example, by comparing the reason statement with the attestations 159 and/or the digital signatures 180 applied to the reason statements in order to form attestation 159. In some embodiments, EDSM 140 may require an exact match between the attestations 159 to determine if they are the same. In some embodiments, EDSM 140 may determine that a partial match is sufficient to determine that the first attestation 159 is the same as the selected attestation 159. If EDSM 140 determines that the first attestation 159 is not the same as the selected attestation 159, then method 400 continues to step 414 described below. If, at step 408, EDSM 140 determines that the first attestation 159 is the same as the selected attestation 159, method 400 continues to step 410.

At step 410, in some embodiments, EDSM 140 determines whether artifact 163 has been altered since the first attestation 159 (or enhanced digital signature 185) was applied to artifact 163. For example, artifact 163 may have been updated, information may have been added to it, or information may have been deleted from artifact 163 since the first attestation 159 was applied to artifact 163. For example, at an earlier time user 151*a* may review artifact 163, determine that there is no confidential information in artifact 163, generate expanded artifact 173 and enhanced digital signature 185 with attestation 159 indicating there is no confidential information (e.g., as described in steps 314 and 318 of FIG. 3 above). Then, at a later time, user 151*a* may edit artifact 163 by adding certain confidential information. Thus, when user 151*b* (or a separate user) attempts to sign artifact 163 with attestation 159 indicating that artifact 163 does not contain confidential information, EDSM 140 can determine that artifact 163 has been altered since user 151*a* created the first enhanced digital signature 185 (e.g., confirming that artifact 163 does not contain any confidential information). If, at step 410, EDSM 140 determines that artifact 163 has been altered since the first attestation 159, then method 400 continues to step 412 where EDSM 140 displays an error indicating that artifact 163 has been altered. For example, when user 151*b* tries to apply a second enhanced digital signature 185 confirming that artifact 163 does not contain confidential information, the error message may be displayed on GUI 152*b* to show that the artifact 163 has been altered. In some embodiments, any enhanced digital signature 185 that user 151*b* applies can only be the first enhanced digital signature 185 regarding the security of the data included in artifact 163 (e.g., rather than a second or additional enhanced digital signature 185 regarding the security of the data included in artifact 163). In other words, user 151*b* may still be able to add her enhanced digital signature 185 to artifact 163, but there would only be one enhanced digital signature 185 for the most recent version of artifact 163, rather than there being two enhanced digital signatures 185. If, at step 410, EDSM 140 determines that artifact 163 has not been altered since the first attestation 159 and first enhanced digital signature 185, then method 400 continues to step 414.

At step 414, in some embodiments, EDSM 140 applies enhanced digital signature 185 of the second user. In some embodiments, step 414 of method 400 may be performed using one or more of the techniques discussed above with respect to the steps of FIG. 3, such as steps 314-318.

At step 416, in certain embodiments, EDSM 140 may determine whether enhanced digital signatures 185 are by approved users. For example, user 151*a* may be in the security group and may be approved to review artifact 163 to determine whether it includes any confidential information, whereas user 151*b* may be regular associate of enterprise 110 and may not have the authority to review artifact 163 regarding its confidential data. Thus, continuing the example, if enhanced digital signature 185 of artifact 163 includes attestation 159 that there is no confidential data in 163 by user 151*a*, EDSM 140 may determine that enhanced digital signature 185 is by an approved user. However, EDSM 140 may determine that enhanced digital signature 185 by user 151*b* is not by an approved user. If, at step 418, EDSM 140 determines that enhanced digital signatures 185 are not by approved users, then EDSM 140 may display an error at step 416 indicating that a non-approved user has created enhanced digital signature 185. If, at step 418, EDSM 140 determines that enhanced digital signatures 185 are by approved users, then method 400 continues to step 420.

At step 420, in some embodiments, EDSM 140 determines the number and type of enhanced digital signatures 185 that are needed in order to validate artifact 163. In some embodiments, there may be multiple reasons to validate various artifacts 163. For example, artifact 163 may need to be validated before certain actions may be taken. These validations may include that artifact 163 contains no confidential data of enterprise 110, that artifact 163 complies with export rules in order to export it to a foreign country, or any other action that relates to artifact 163. In order to be validated, artifact 163 may require a certain number and type of enhanced digital signatures 185 with the same attestation 159. For example, an artifact 163 with a low risk may require only one enhanced digital signature 185 before it can be validated to take certain action, whereas, higher risk actions may require a larger number of enhanced signatures 185. For example, before artifact 163 may be transmitted outside of enterprise 110, EDSM 140 may require four enhanced digital signatures 185 indicating that artifact 163 contains no confidential information of enterprise 110. That may include four separate users (e.g., 151*a*, 151*b*, and two others) creating four unique enhanced digital signatures 185 with the same attestation 159, such as "I have reviewed this artifact and it contains no confidential data of Enterprise 110."

At step 422, in some embodiments, EDSM 140 may determine whether the number of enhanced digital signatures 185 associated with artifact 163 (and with reason statements relevant to the purpose for validation) is greater than or equal to the number of enhanced digital signatures 185 required to validate artifact 163 for a certain purpose. If, at step 422, EDSM 140 determines that the number of enhanced digital signatures 185 is not greater than or equal to the number of signatures needed to validate, then method 400 ends and no action may be taken with the artifact 163. If, at step 422, the number of enhanced digital signatures 185 is greater than or equal to the number of signatures needed to validate, then method 400 continues to step 424 and EDSM 140 validates artifact 163. For example, if artifact 163 needs to be sent to a foreign country, in order to validate artifact 163 such that it can be sent to a foreign country, EDSM 140 may determine that artifact 163 requires three separate enhanced digital signatures 185 with the same attestations 159, for example: "I have reviewed this artifact and have determined that it complies with the export rules in order to send export to France." EDSM 140 may determine artifact 163 has seven enhanced digital signatures 185 with attestation 159 regarding exporting to France. EDSM 140 may then compare the seven enhanced digital signatures 185 to the required number of signatures needed to validate and send artifact 163 to a foreign country. For example, the number of required enhanced digital signatures 185 may be four. Continuing this example, EDSM 140 may determine that artifact 163 has a sufficient number of enhanced digital signatures 185 (seven is greater than four) and thus may validate the artifact 163 at step 424.

At step 426, in some embodiments, EDSM 140 takes an action with artifact 163 relating to the validation at step 424. Continuing the example from above, EDSM 140 may determine that there are a sufficient number of enhanced digital signatures 185 to be able to send artifact 163 to a foreign country. Once artifact 163 is validated for that purpose, an action may then be carried out. In the example above, the action may be transmitting artifact 163 to France. Other actions associated with a validation may include transmitting artifact 163 to third-party entity 130 (e.g., outside of enterprise 110), indicating that artifact 163 is complete and finalized, or incorporating artifact 163 (e.g., a piece of code) into another artifact 163 (e.g., a larger block of code). If the purpose involves sending artifact 163 to third-party entity 130, then the method continues to step 426 where EDSM 140 sends artifact 163 to third-party entity 130. After taking the action that is associated with the validation, method 400 ends.

Modifications, additions, or omissions may be made to the methods described herein without departing from the scope of the invention. For example, the steps may be combined, modified, or deleted where appropriate, and additional steps may be added. In some embodiments, EDSM 140 may not need to take an action related to artifact 163 after it has been validated, such that step 426 may be omitted. Additionally, the steps may be performed in any suitable order without departing from the scope of the present disclosure. While discussed as EDSM 140 performing the steps, any suitable component of system 100 may perform one or more steps of the method.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
   storing, by one or more computing systems in one or more memory devices, a plurality of attestations, at least one of the plurality of attestations comprising a reason statement for signing an artifact;
   displaying, by the one or more computing systems, at least one of the plurality of attestations;
   receiving, by the one or more computing systems, a first selection of a first attestation;
   generating, by the one or more computing systems, an expanded artifact by concatenating the artifact and the first attestation;
   creating, by the one or more computing systems, a first digital signature based on the expanded artifact;
   creating, by the one or more computing systems, a first, enhanced digital signature by concatenating the first digital signature and the first attestation; and
   storing, by the one or more computing systems in the one or more memory devices, the first enhanced digital signature.

2. The method of claim 1, further comprising:
   displaying, by the one or more computing systems, a reason statement for signing at least one of the plurality of artifacts;
   receiving, by the one or more computing systems, an approval of the reason statement;
   determining, by the one or more computing systems, whether the approval was received from an approved user;

in response to determining that the approval was received from the approved user, creating, by the one or more computing systems, the first attestation by applying a second digital signature to the reason statement; and storing, by the one or more computing systems in the one or more memory devices, the first attestation.

3. The method of claim 1, further comprising:

determining, by the one or more computing systems, that the artifact requires a second enhanced digital signature, the second enhanced digital signature associated with a second authorized user;

receiving, by the one or more computing systems, a second selection of the first attestation;

generating, by the one or more computing systems, a second expanded artifact by concatenating the artifact and the first attestation;

creating, by the one or more computing systems, a second digital signature based on the second expanded artifact;

creating, by the one or more computing systems, a second enhanced digital signature by concatenating the second digital signature and the first attestation; and storing, by the one or more computing systems in the one or more memory devices, the second enhanced digital signature.

4. The method of claim 1, further comprising:

determining, by the one or more computing systems, that the artifact requires a second enhanced digital signature, the second enhanced digital signature associated with a second authorized user;

receiving, by the one or more computing systems, a second selection of a second attestation; and determining, by the one or more computing systems, that the first attestation and the second attestation are the same.

5. The method of claim 1, further comprising:

determining, by the one or more computing systems, that the artifact requires a second enhanced digital signature, the second enhanced digital signature associated with a second authorized user;

receiving, by the one or more computing systems, a second selection of the first attestation;

determining, by the one or more computing systems, that the artifact has been altered since the first enhanced digital signature was created; and in response to determining that the artifact has been altered since the first enhanced digital signature was created, displaying an error message, the error message indicating that the artifact has been altered since the first enhanced digital signature was created.

6. The method of claim 1, further comprising:

receiving, by the one or more computing systems, a request to validate the artifact for a purpose, the purpose associated with the reason statement of the first attestation;

determining, by the one or more computing systems, a number of enhanced digital signatures required to validate the artifact for the purpose;

determining, by the one or more computing systems, whether the number of enhanced digital signatures associated with the artifact is greater than or equal to the number of enhanced digital signatures required to validate the artifact for the purpose; and in response to determining that the number of enhanced digital signatures associated with the artifact is greater than or equal to the number of enhanced digital signatures required to validate the artifact for the purpose, validating, by the one or more computing systems, the artifact for the purpose.

7. The method of claim 6, wherein:

the purpose comprises transmitting the artifact to a third party; and the method further comprises, in response to validating the artifact for the purpose, transmitting the artifact to the third party.

8. A non-transitory computer readable medium containing logic, the logic when executed, operable to:

store a plurality of attestations, at least one of the plurality of attestations comprising a reason statement for signing an artifact;

display at least one of the plurality of attestations;

receive a first selection of a first attestation;

generate an expanded artifact by concatenating the artifact and the first attestation;

create a first digital signature based on the expanded artifact;

create a first enhanced digital signature by concatenating the first digital signature and the first attestation; and store the first enhanced digital signature.

9. The computer readable medium of claim 8, the logic further operable to:

display a reason statement for signing at least one of the plurality of artifacts;

receive an approval of the reason statement;

determine whether the approval was received from an approved user;

in response to determining that the approval was received from the approved user, create the first attestation by applying a second digital signature to the reason statement; and store the first attestation.

10. The computer readable medium of claim 8, the logic further operable to:

determine that the artifact requires a second enhanced digital signature, the second enhanced digital signature associated with a second authorized user;

receive a second selection of the first attestation;

generate a second expanded artifact by concatenating the artifact and the first attestation;

create a second digital signature based on the second expanded artifact;

create a second enhanced digital signature by concatenating the second digital signature and the first attestation; and store the second enhanced digital signature.

11. The computer readable medium of claim 8, the logic further operable to:

determine that the artifact requires a second enhanced digital signature, the second enhanced digital signature associated with a second authorized user;

receiving a second selection of a second attestation; and determine that the first attestation and the second attestation are the same.

12. The computer readable medium of claim 8, the logic further operable to:

determine that the artifact requires a second enhanced digital signature, the second enhanced digital signature associated with a second authorized user;

receive a second selection of the first attestation;

determine that the artifact has been altered since the first enhanced digital signature was created; and in response to determining that the artifact has been altered since the first enhanced digital signature was created, display an error message, the error message indicating that the artifact has been altered since the first enhanced digital signature was created.

13. The computer readable medium of claim 8, the logic further operable to:
   receive a request to validate the artifact for a purpose, the purpose associated with the reason statement of the first attestation;
   determine a number of enhanced digital signatures required to validate the artifact for the purpose;
   determine whether the number of enhanced digital signatures associated with the artifact is greater than or equal to the number of enhanced digital signatures required to validate the artifact for the purpose; and
   in response to determining that the number of enhanced digital signatures associated with the artifact is greater than or equal to the number of enhanced digital signatures required to validate the artifact for the purpose, validate the artifact for the purpose.

14. The computer readable medium of claim 13, wherein:
   the purpose comprises transmitting the artifact to a third party; and
   the logic is further operable to, in response to validating the artifact for the purpose, transmit the artifact to the third party.

15. A system comprising a memory, a processor, and an interface, the system operable to:
   store a plurality of attestations, at least one of the plurality of attestations comprising a reason statement for signing an artifact;
   display at least one of the plurality of attestations;
   receive a first selection of a first attestation;
   generate an expanded artifact by concatenating the artifact and the first attestation;
   create a first digital signature based on the expanded artifact;
   create a first enhanced digital signature by concatenating the first digital signature and the first attestation; and
   store the first enhanced digital signature.

16. The system of claim 15, the system further operable to:
   display a reason statement for signing at least one of the plurality of artifacts;
   receive an approval of the reason statement;
   determine whether the approval was received from an approved user;
   in response to determining that the approval was received from the approved user, create the first attestation by applying a second digital signature to the reason statement; and
   store the first attestation.

17. The system of claim 15, the system further operable to:
   determine that the artifact requires a second enhanced digital signature, the second enhanced digital signature associated with a second authorized user;
   receive a second selection of the first attestation;
   generate a second expanded artifact by concatenating the artifact and the first attestation;
   create a second enhanced digital signature by concatenating the second digital signature and the first attestation; and
   store the second enhanced digital signature.

18. The system of claim 15, the system further operable to:
   determine that the artifact requires a second enhanced digital signature, the second enhanced digital signature associated with a second authorized user;
   receive a second selection of a second attestation; and
   determine that the first attestation and the second attestation are the same.

19. The system of claim 15, the system further operable to:
   determine that the artifact requires a second enhanced digital signature, the second enhanced digital signature associated with a second authorized user;
   receive a second selection of the first attestation;
   determine that the artifact has been altered since the first enhanced digital signature was created; and
   in response to determining that the artifact has been altered since the first enhanced digital signature was created, display an error message, the error message indicating that the artifact has been altered since the first enhanced digital signature was created.

20. The system of claim 15, the system further operable to:
   receive a request to validate the artifact for a purpose, the purpose associated with the reason statement of the first attestation;
   determine a number of enhanced digital signatures required to validate the artifact for the purpose;
   determine whether the number of enhanced digital signatures applied to the expanded artifact is greater than or equal to the number of enhanced digital signatures required to validate the artifact for the purpose; and
   in response to determining that the number of enhanced digital signatures applied to the expanded artifact is greater than or equal to the number of enhanced digital signatures required to validate the artifact for the purpose, validate the artifact for the purpose.

* * * * *